US008978296B2

(12) United States Patent
Zinger (10) Patent No.: US 8,978,296 B2
(45) Date of Patent: Mar. 17, 2015

(54) WATERING SYSTEM AND METHOD OF IMPLEMENTING

(76) Inventor: Itzhak Zinger, Emet Hefer (IL)

( * ) Notice: Subject to any disclaimer, the term of this patent is extended or adjusted under 35 U.S.C. 154(b) by 143 days.

(21) Appl. No.: 13/552,067

(22) Filed: Jul. 18, 2012

(65) Prior Publication Data

US 2014/0020290 A1    Jan. 23, 2014

(51) Int. Cl.
*A01G 29/00*    (2006.01)
(52) U.S. Cl.
CPC ..................... *A01G 29/00* (2013.01)
USPC ............................... 47/48.5; 405/45
(58) Field of Classification Search
CPC .................................... A01G 29/00
USPC ............................... 47/48.5; 405/45
See application file for complete search history.

(56) References Cited

U.S. PATENT DOCUMENTS

| | | | | | |
|---|---|---|---|---|---|
| 588,278 | A | * | 8/1897 | Kling | 47/48.5 |
| 2,791,347 | A | * | 5/1957 | Boehm | 165/45 |
| 3,460,562 | A | * | 8/1969 | Moulder | 137/268 |
| 3,755,966 | A | * | 9/1973 | Smith | 47/48.5 |
| 3,821,863 | A | * | 7/1974 | Chan | 47/48.5 |
| 3,900,962 | A | * | 8/1975 | Chan | 47/48.5 |
| 4,340,179 | A | * | 7/1982 | Knapp | 239/310 |
| 4,726,143 | A | * | 2/1988 | Steinbeck | 47/48.5 |
| 4,741,125 | A | * | 5/1988 | Demorest | 47/81 |
| 4,866,880 | A | * | 9/1989 | Weinblatt | 47/79 |
| 4,928,427 | A | | 5/1990 | Patterson | |
| 4,932,159 | A | | 6/1990 | Holtkamp | |
| 5,016,548 | A | * | 5/1991 | Ito | 111/114 |
| 5,212,904 | A | * | 5/1993 | Green et al. | 47/48.5 |
| 5,443,544 | A | * | 8/1995 | Azoulay | 47/48.5 |
| 5,511,341 | A | | 4/1996 | Payne | |
| 5,761,846 | A | * | 6/1998 | Marz | 47/48.5 |
| 5,795,100 | A | * | 8/1998 | Thomas et al. | 405/45 |
| 5,806,241 | A | | 9/1998 | Byland | |
| 5,809,692 | A | | 9/1998 | Kesler et al. | |
| 5,901,497 | A | | 5/1999 | Bulvin | |
| 5,975,797 | A | * | 11/1999 | Thomas et al. | 405/45 |
| 6,192,623 | B1 | * | 2/2001 | Higginbotham | 47/48.5 |
| 6,405,482 | B1 | | 6/2002 | Skaife | |
| 6,540,436 | B2 | | 4/2003 | Ogi et al. | |
| 7,627,982 | B2 | | 12/2009 | Beasley et al. | |
| 8,413,372 | B2 | * | 4/2013 | King | 47/48.5 |
| 2004/0139650 | A1 | * | 7/2004 | Haq | 47/48.5 |

FOREIGN PATENT DOCUMENTS

GB    2249463 A  *  5/1992  ............ A01G 29/00

* cited by examiner

*Primary Examiner* — Kristen C Hayes (57) ABSTRACT

A watering system for providing a flora-nourishing substance to flora. The system comprises a nourishment receiving and delivery mechanism for receiving and delivering the flora nourishing substance; and at least one percolation bore disposed adjacent to the flora and at least partially filled with a material for absorbing the nourishing substance.

13 Claims, 7 Drawing Sheets

WATERING SYSTEM AND METHOD OF IMPLEMENTING

FIELD OF THE INVENTION

The present invention relates to a watering system and method of implementing it, more particularly, a system for watering flora in water-impermeable ground and a method of producing same.

BACKGROUND OF THE INVENTION

In some geographic areas it is difficult for trees and shrubs to receive water and fertilization naturally, due to the ground conditions.

For example, ground such as cohesive soil or other impermeable ground, which may comprise clay for example, require special watering and fertilization in order to achieve desirable growth. Climate conditions, such as those found in arid environments also contribute to natural watering difficulties. U.S. Pat. No. 6,540,436 and KR2074043 relate to such issues.

SUMMARY OF THE INVENTION

According to one aspect, the present invention relates to a watering system for watering trees, shrubs and other such flora, the system particularly suited for use in an arid climate and/or where the ground does not readily absorb or hold water.

Accordingly, the present invention provides a watering system for providing nourishment (e.g. water, fertilizer and the like) to flora, more particularly their roots. The system comprises: a nourishment receiving and delivery mechanism for receiving and delivering the flora nourishing substance; and at least one percolation bore disposed adjacent to the flora and at least partially filled with a material for absorbing the nourishing substance.

According to particular embodiments, a sleeve is disposed within each percolation bore. The sleeve has a portion partially extending downward into each percolation bore and a portion extending above the surface of the ground. The portion extending above the ground has a plurality of first debris filtering apertures; and an anchoring member snugly fitting around the portion of the sleeve extending above the surface, or otherwise attached thereto, that allows water from the drainage bore to pass therethrough.

According to particular embodiments, the watering system further comprises an insert disposed within the sleeve. The insert has a plurality of second debris filtering apertures and a precipitance floor peripherally disposed to a lower portion of the insert for collecting small debris that has breached the first debris filtering apertures.

According to another aspect of the present invention there is provided a method of implementing a watering system suitable for plantable flora, comprising the steps of: digging at least one percolation bore; filling the percolation bore at least partially with an absorbent material; connecting the at least one percolation bore to a nourishment receiving and delivery mechanism; and planting the flora adjacent the percolation bore.

According to yet another aspect of the present invention there is provided a method of implementing a watering system suitable for providing nourishment to an existing tree, comprising the steps of: digging a drainage bore; digging at least one percolation bore within the drainage bore; filling the percolation bore at least partially with an absorbent material; inserting a portion of a sleeve at least part way into the percolation bore downwardly, leaving at least a portion of the bore extended upwardly from the percolation bore; and inserting an insert within the sleeve; and disposing an anchoring member about the portion of the sleeve extending upwardly from the percolation bore.

BRIEF DESCRIPTION OF THE DRAWINGS

The invention may be understood upon reading of the following detailed description of non-limiting exemplary embodiments thereof, with reference to the following drawings, in which.

DETAILED DESCRIPTION OF THE INVENTION

FIGS. 1-6 show embodiments of a watering system 10 of the present invention including: a drainage bore 12; one or a plurality of spaced apart percolation bores 14 having sleeves 16 extending partway down into the percolation bores and also extending upward above the surface of the ground, which comprises a debris filtering portion 17.

According to some embodiments, sleeves 16 have lids 18 with handles 20 (FIG. 2) and an anchoring member, such as a shielding mesh skirt 22. According to other embodiments, lids 18 and handles 20 are attached to an insert (discussed below with reference to FIG. 5). Percolation bores 14 are generally filled with absorbent material 23, such as minerals (e.g. expanded or fine perlite, vermiculite, tuff, coconut fiber or any combination thereof) for helping absorb, retain and transmit nutritional substances, such as rain water and/or fertilizer in the vicinity of the roots 24 of flora such as tree 26.

Figure 2:
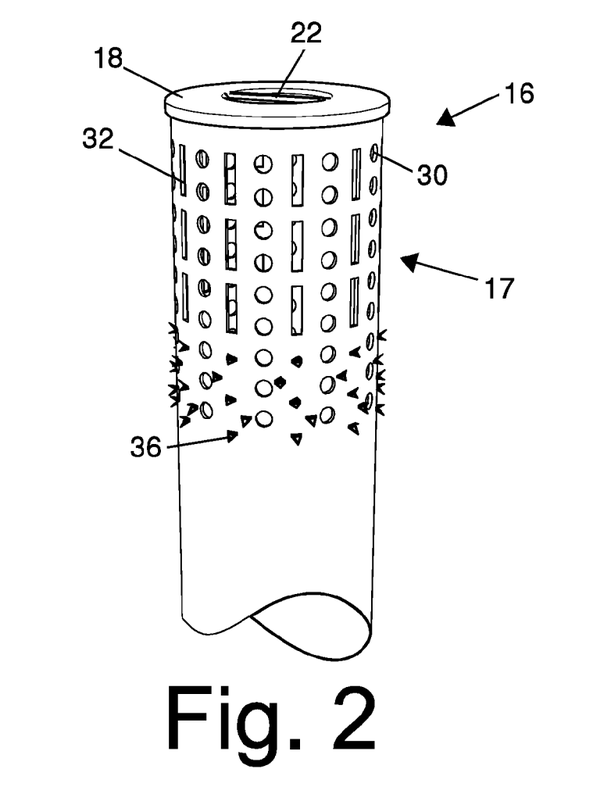
FIG. 2 is an isometric front view of a sleeve of the embodiment of FIG. 1.
Figure 3:
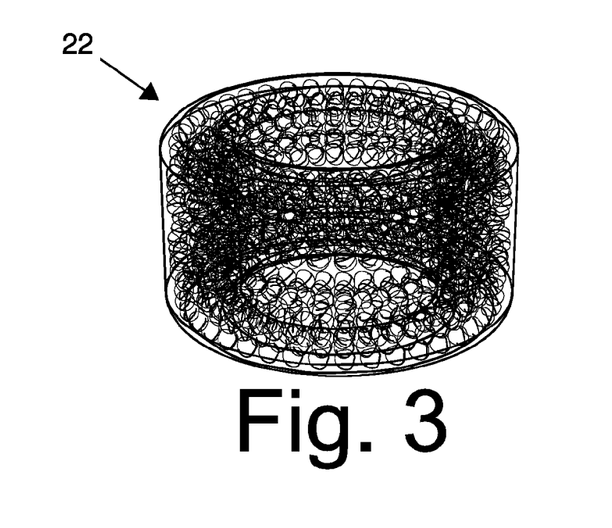
FIG. 3 is an isometric front view of a shielding mesh skirt of the embodiment of FIG. 1.

FIGS. 2 and 3 show enlarged isometric views of one of the sleeves 16 and shielding mesh skirt 22, respectively, of the watering system 10.

Referring to FIG. 2, filtering portion 17 of sleeve 16 comprises a plurality of first debris filtering apertures, such as holes 30 and slits 32, which are typically more or less evenly distributed, to help prevent small-sized particles from infiltrating the sleeves 16. Lid 18 is disposed on top of each sleeve 16, typically integral with sleeve 16 for easy removal. Typically, handle 20 is sunken within lid 18, for preventing unintended removal of the lid, for example, by passing animals, wind, hail, etc. Shielding mesh skirt 22 snugly fits around sleeves 16 (FIGS. 1, 4 and 5) typically around filtering portion 17. Shielding mesh skirt 22 may be made of a radiation resistant material, such as, but not limited to, dark colored plastics, for protecting the surface of the skirt from radiation, such as heat and sun, and is filled with large-sized particles (not shown), such as construction aggregates, e.g. gravel. The weight of such particles acts as an anchor preventing dislocation of the sleeves 16. Shielding mesh skirt 22 also acts as a primary filtering element for materials such as leaves, stones, and the like. Sleeves 16 have mesh skirt supporting members or projections 36, which are distributed about the lower part of filtering portion 17 for securing mesh skirt 22 to the filtering portion.

Figure 1:
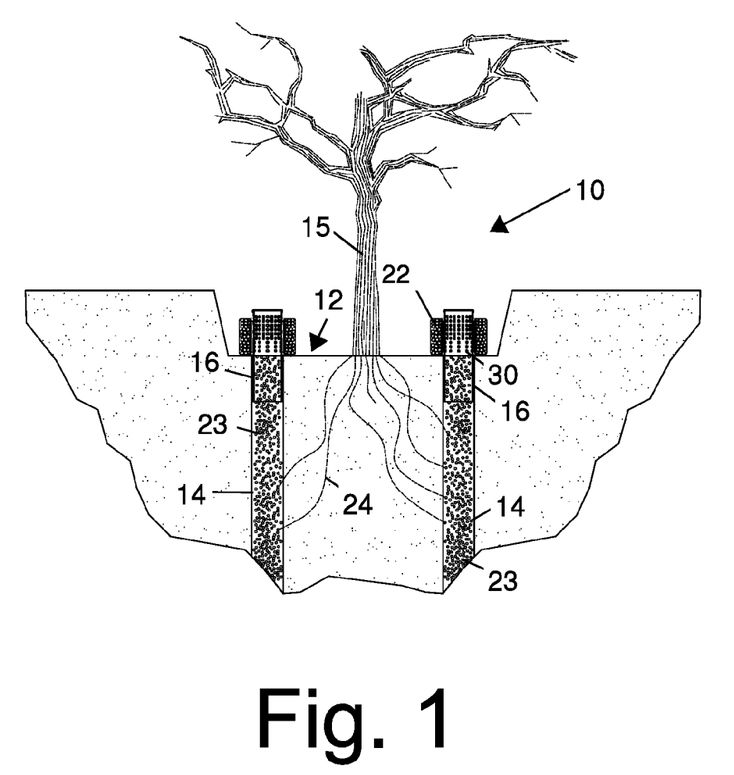
FIG. 1 is an exploded view of an embodiment of a watering system in accordance with the present invention.
Figure 4:
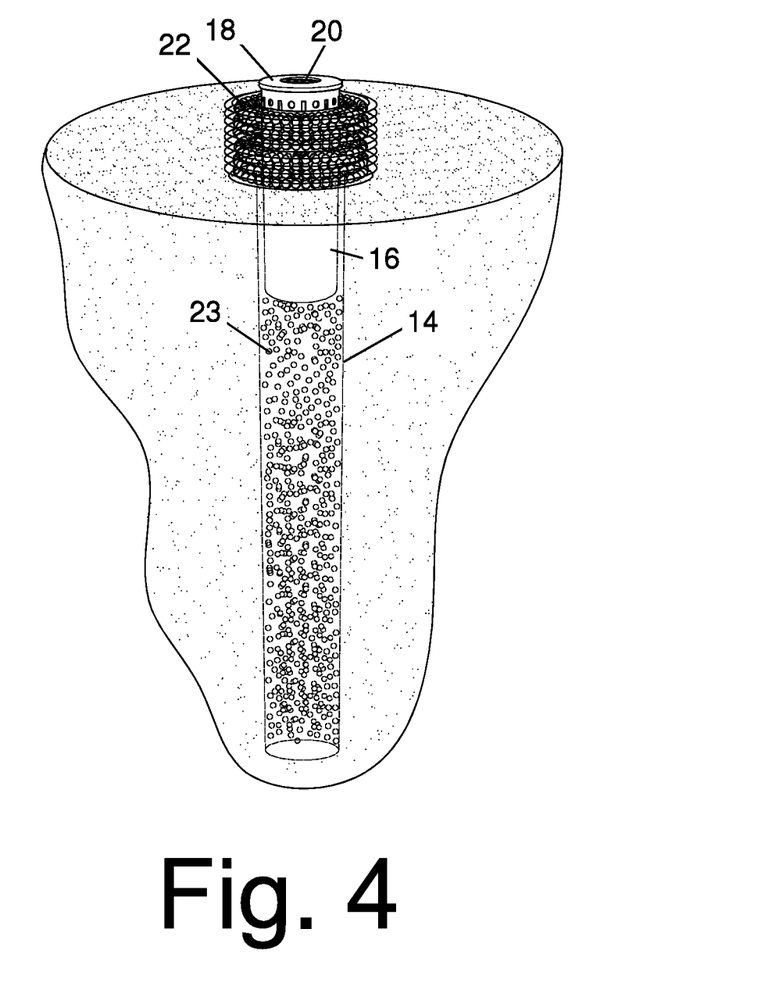
FIG. 4 is a front view a percolation bore of FIG. 1, assembled with the sleeve of FIG. 2 and the shielding mesh skirt of FIG. 3.
Figure 5:
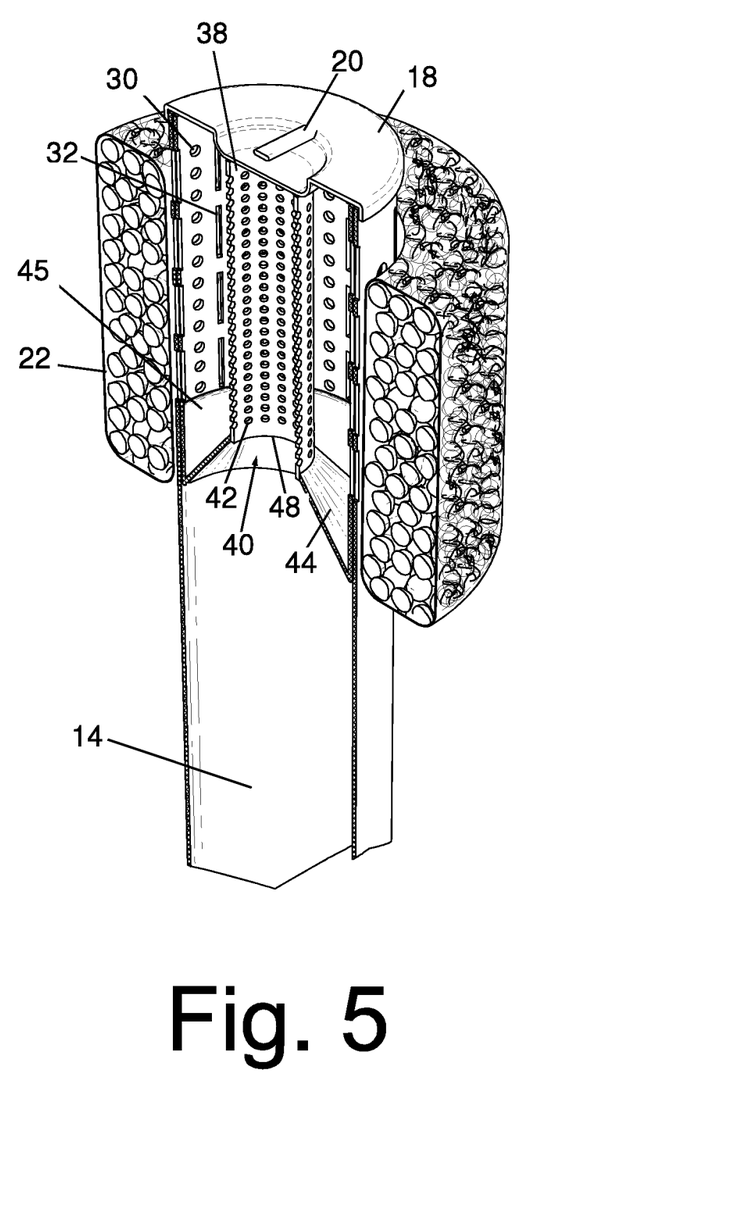
FIG. 5 is a cross sectional isometric view of the sleeve and the shielding mesh skirt of FIG. 4.

FIG. 5 shows a cross sectional isometric view of one of the sleeves 16 and shielding mesh skirt 22. As mentioned above, filtering portion 17 of sleeve 16 and shielding mesh skirt 22 help filter debris from water that has accumulated in drainage bore 12 (FIG. 1). In this embodiment, the system comprises an insert 40 disposed within filtering portion 17 of sleeve 16. Insert 40 comprises a cylindrical portion 38, typically having a plurality of debris filtering apertures, such as openings 42; and a precipitance floor 44 for collecting accumulated debris. Floor 44 extends peripherally outward from the lower edge of cylindrical portion 38 and is typically sloped, but can be optionally formed as a flat base. Extending partway upward from the outer edge of floor 44 is a cylindrical wall 45 thereby forming an annular collection volume for accumulating debris. Insert 40 has a central opening 48 at its bottom wherethrough water can descend down into percolation bore 14 to be releasably absorbed by absorbent material 23 (FIG. 4).

Figure 6:
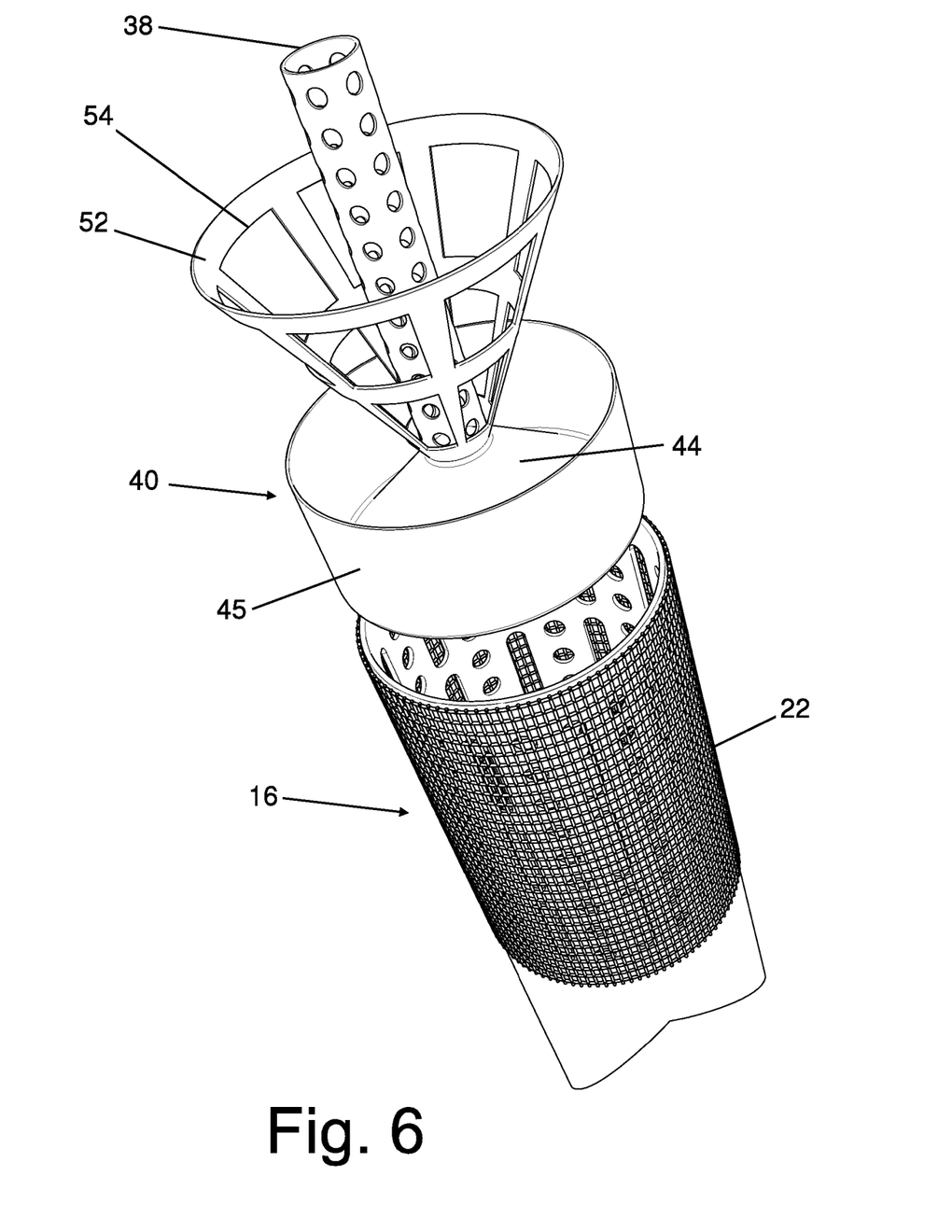
FIG. 6 is a isometric view of another embodiment of the watering system in accordance with the present invention.

FIG. 6 shows another embodiment of the watering system providing a sleeve 16 covered with a shielding mesh skirt 22 and a removably attached insert 40. Insert 40 has a sloped floor 44 having an annular wall 50, a cylindrical portion 38 and conical filter member 52. As aforementioned, floor 44 and wall 45 are used as a collection volume for accumulating debris. Typically, filter member 52 has a plurality of filter accommodating apertures 54. Fabric, plastic or other filter means can be arranged on apertures 54. It is a particular feature of the present embodiment that filter member 52 has a sloped shape (e.g. inverted conical shape, as shown), to direct debris downward to floor 44.

It should be noted that insert 40 is removable for convenient removal of debris accumulated on floor 44. In other embodiments, only insert 40 is disposed within sleeve 16, yet floor 44 still can be individually and removably installed with the sleeve.

In summary, there are three main water filtering stages. First, shielding mesh skirt 22 prevents large sized particles from entering sleeve 16. Second, holes 30 and slits 32 filter smaller sized debris, and openings 42 provide yet a third filtering stage. As a result, water that collects in drainage bore 12 is filtered until it eventually is temporarily stored in absorbent material 23 prior to migrating into the ground adjacent the roots 24 of the flora.

The number of bores 14 and the size and depth of each bore should be determined in accordance with the flora and climate conditions of the area. For example, a particularly arid area may require deeper and greater number of bores 12 and 14 to facilitate greater water accumulating efficiency.

The present watering system 10 may have an associated irrigation system, such as, a sprinkler or dripper system. The irrigation may carry out by reclaimed water or by the water accumulated in other drainage bores.

Figure 7:
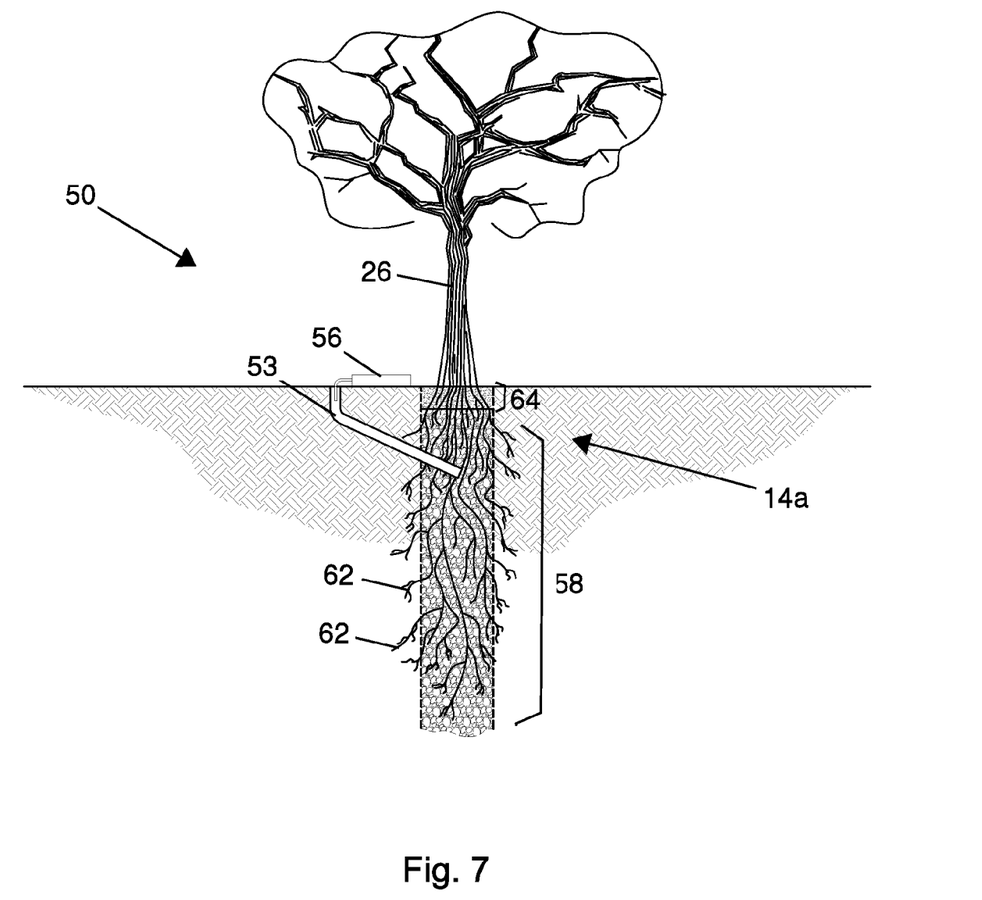
FIG. 7 is a cross sectional view of yet another embodiment of the watering system in accordance with the present invention.

FIG. 7 shows an alternative implementation of the watering system in accordance with the present invention. Watering system 10 of this embodiment comprises: a percolation bore 14a; a flora nutrition conduit 53; and a nutrition supply source exemplified by a nourishment or water supply tank 56. Flora nutrition conduit 53 and water supply tank 56 fulfill an analogous function to drainage bores 12 wherein they help provide water to the percolation bore 14a.

Percolation bore 14a is intended to be formed prior to the planting of tree 26 or other such flora, and is typically located beneath at least a portion of the base of the tree. Percolation bore 14a typically has a lower portion 58 at least partially filled with absorbent material (not visible), such as absorbent material 23, for helping absorb, retain and transmit nutritional substances, such as water and/or fertilizer in the vicinity of the roots 62 of the tree 26. An upper portion 64 of the percolation bore 14a is filled with soil dug out from the ground during the drilling of bore 14a. Optionally, flora-nourishing substances, such as, fertilizers can be added to the soil.

Nutrition conduit 53 can be made of any material suitable for plumbing, such as, plastic, metal, etc. that can convey a flora-nourishing substance from water supply tank 56 to the percolation bore's lower portion 58.

Thus, this implementation also helps provide a flora-nourishing substance to flora growing in cohesive/dense, semi or fully water impermeable soil. In addition, the absorbent material 60 of watering system 10 aides proper growth for the roots 62 of the tree 26 by encouraging their growing path to a deeper and more spread area beneath ground level.

Figure 8:
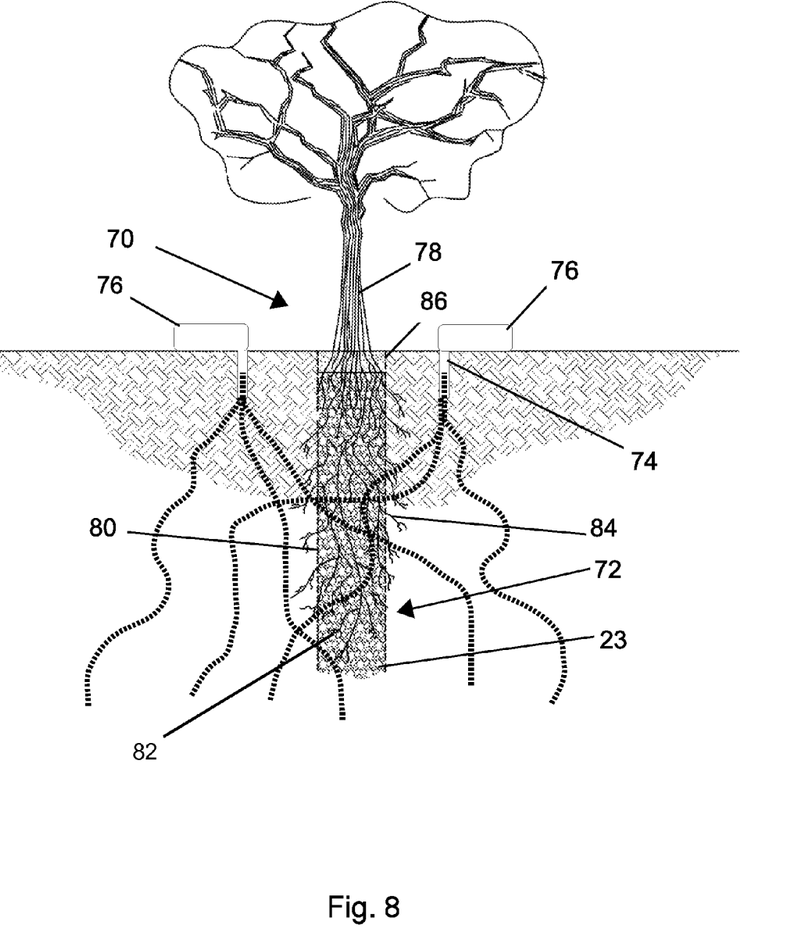
FIG. 8 is a cross sectional view of additional embodiment of the watering system in accordance with the present invention which is adapted for use with dense soil.

FIG. 8 shows another embodiment of the watering system in accordance with the present invention that is particularly suited for irrigation of dense soil. Watering system 70 of this embodiment comprises: a percolation bore 72; an external flora nutrition conduit 74; and a nutrition supply source exemplified by a nourishment or water supply tank 76. In this embodiment, flora nutrition conduit 74 extends downward, adjacent but external to bore 72.

Percolation bore 72 is intended to be formed prior to the planting of tree 78 or other such flora, and is typically located beneath at least a portion of the base of the tree. Percolation bore 72 typically has a lower portion 80 at least partially filled with absorbent material 82 for helping absorb, retain and transmit nutritional substances, such as water and/or fertilizer in the vicinity of the roots 84 of tree 78. Percolation bore 72 has an upper portion 86, which can be filled with soil dug out from the ground during the drilling of bore 72. Optionally, flora-nourishing substances, such as, fertilizers, can be added to the soil. Typically, the depth of external flora nutrition conduit 74 is approximately identical to the depth of upper portion 86 of the percolation bore 72.

It should be noted that this embodiment is distinctively adapted for use in dense soils, such as, loess and marl which are characterized by two main traits. First, contrary to the soil involved in the former embodiments, this soil can readily percolate water downward. Second, the particles of this dense soil have smaller air voids therebetween, thus flora growth is limited. When irrigating the flora, using the watering system of this embodiment, conduit 74 transfers water to an area surrounding lower portion 80 of bore 72. The water discharges from conduit 74 and penetrates downward toward the roots of the flora, while excess water accumulates at absorbent material 23 and if needed can flow upward in accordance with capillarity forces. Thus, space for aeration (air voids) is preserved better, while excess water is held for future need for the flora.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A watering system for providing a flora-nourishing substance to flora, the system comprising:
 a nourishment receiving and delivery mechanism for receiving and delivering the flora nourishing substance;
 at least one percolation bore disposed adjacent to the flora and at least partially filled with a material for absorbing the nourishing substances;
 a sleeve disposed within the percolation bore and having a portion partially extending downward into each percolation bore and a portion extending above the surface of the ground, the portion extending above the ground having a plurality of first debris filtering apertures; and
 an insert disposed within the sleeve, and having a plurality of second debris filtering apertures and a precipitance floor peripherally disposed in a lower portion of the insert for collecting small debris that has breached the second debris filtering apertures, and the insert is conically sloped to help direct debris toward the precipitance floor.

2. The watering system as in claim 1, the system further comprising
 an anchoring member snugly fitting around or attached to the portion of the sleeve extending above the surface of the ground.

3. The watering system as in claim 2, wherein the anchoring member has within it particulate material for providing ballast to the anchoring member and/or providing primary debris filtering.

4. The watering system as in claim 3, wherein the particulate material comprise gravel or other construction aggregates.

5. The watering system as in claim 2, wherein the anchoring member is a shielding mesh skirt.

6. The watering system as in claim 1, wherein the material for absorbing the nourishing substance comprises one of the group consisting of: expanded or fine perlite; vermiculite; tuff, coconut fibre; or a mixture thereof.

7. The watering system as in claim 1, wherein the floor is sloped.

8. The watering system as in claim 1, wherein the insert further comprises a tube lid with a handle allowing removal of the insert from the sleeve.

9. The watering system as in claim 1, wherein the portion of the sleeve extending above the ground has a plurality of projections for supporting the anchoring member.

10. The watering system as in claim 1, wherein the nourishment receiving and delivery mechanism comprises a drainage bore.

11. The watering system as in claim 1, wherein the nourishment receiving and delivery mechanism comprises a conduit and nourishment supply tank.

12. The watering system as in claim 11, wherein the conduit extends downwardly into the percolation bore.

13. The watering system as in claim 11, wherein the conduit extends downwardly, external to the percolation bore.

\* \* \* \* \*